(12) United States Patent
Tung et al.

(10) Patent No.: US 7,495,362 B2
(45) Date of Patent: Feb. 24, 2009

(54) ELECTRICAL FAN

(75) Inventors: Chao-Nien Tung, Guangdong (CN);
Chuen-Shu Hou, Guangdong (CN);
Chih-Hao Yang, Guangdong (CN);
Shun-I Wu, Guangdong (CN); Ming Zhong, Guangdong (CN)

(73) Assignees: Fu Zhun Precision Industry (Shen Zhen) Co., Ltd., Longhue Town, Bao'an District, Shenzhen, Guangdong Province (CN); Foxcomm Technology Co., Ltd., Tu-Cheng, Taipei Hsien (TW)

( * ) Notice: Subject to any disclaimer, the term of this patent is extended or adjusted under 35 U.S.C. 154(b) by 378 days.

(21) Appl. No.: 11/308,722

(22) Filed: Apr. 26, 2006

(65) Prior Publication Data
US 2007/0013242 A1 Jan. 18, 2007

(30) Foreign Application Priority Data
Jul. 15, 2005 (CN) .......................... 2005 1 0036038

(51) Int. Cl.
*H02K 1/12* (2006.01)
(52) U.S. Cl. ........................ 310/156.26; 310/156.38; 310/63; 416/3; 417/423.7

(58) Field of Classification Search ............... 310/67 R, 310/63, 156.38, 156.26, 62; 416/3; 417/423.7, 417/356
See application file for complete search history.

(56) References Cited

U.S. PATENT DOCUMENTS

| 3,447,469 | A | * | 6/1969 | Laing | 417/423.7 |
|---|---|---|---|---|---|
| 4,730,989 | A | * | 3/1988 | Laing | 417/357 |
| 5,808,395 | A | * | 9/1998 | Anders et al. | 310/266 |
| 6,132,186 | A | * | 10/2000 | Cooper et al. | 417/423.7 |
| 6,672,839 | B2 | | 1/2004 | Schloetzer | |
| 6,713,907 | B2 | * | 3/2004 | Matsumoto | 310/67 R |
| 6,713,925 | B2 | * | 3/2004 | Laing et al. | 310/179 |
| 6,952,068 | B2 | | 10/2005 | Gieras et al. | |
| 2005/0067917 | A1 | | 3/2005 | Kastinger | |

* cited by examiner

*Primary Examiner*—Dang D Le
(74) *Attorney, Agent, or Firm*—Winston Hsu

(57) ABSTRACT

A electrical fan includes a frame (10) having a central tube (11), a bearing (30) received in the central tube, a stator (50) mounted around the central tube, and a rotor (70) being rotatably supported by a bearing in the stator. The frame defines an air inlet (19) and an air outlet (17) at two different sides thereof. The stator and the rotor expand radially along a direction from the air inlet to the air outlet. Fan blades (75) extend radially from the rotor. A hub (71) of the rotor has a streamline shaped outer surface. A stator core (511) of the stator is made by powder sintering technology.

17 Claims, 8 Drawing Sheets

ELECTRICAL FAN

CROSS-REFERENCES TO RELATED APPLICATION

This application is related to a co-pending application entitled "FERROMAGNETIC POWDER FOR DUST CORE", invented by Chao-Nien Tung, Chuen-Shu Hou, Chih-Hao Yang and Lung-Wei Huang, assigned to the same assignee of this application and filed on Apr. 13, 2006 with Ser. No. 11/308,530. The disclosure of the co-pending application is wholly incorporated herein by reference.

FIELD OF THE INVENTION

The present invention relates to an electrical fan, and more particularly to a motor of such an electrical fan.

DESCRIPTION OF RELATED ART

With continuing development of the electronic technology, electronic packages such as CPUs (central processing units) are generating more and more heat that is required to be dissipated immediately. Electrical cooling fans are commonly used in combination with heat sinks for cooling the CPUs.

Referring to FIG. 8, a conventional electrical cooling fan includes a stator 6, a rotor 8 rotatable with respect to the stator 6, and a fan housing 2 receiving the rotor 8 and stator 6 therein. The stator 6 is approximately cylinder-shaped and typically includes a stator core 62 and stator coils 64 wound around the stator core 62. The stator core 62 consists of layered yokes. Each yoke includes a ring shaped center portion and a plurality of pole members extending outwardly from the center portion for winding the coils thereon. To avoid the coils 64 from electrically contacting with the stator core 62, upper and lower insulating frames 66, 68 are used to cover the stator core 62 and electrically insulate the stator coils 64 from the stator core 62. The rotor 8 includes an inverted U-shaped hub 82 surrounding the stator 6. The hub 82 includes a flat, disc-shaped top wall 81 and a sidewall 83 extending downwardly from an outer-periphery of the top wall 81. A plurality of fan blades 86 extends outwardly from the sidewall 83, and a cylinder-shaped permanent magnet 84 adheres to an inner surface of the sidewall 83 of the hub 82. A shaft 88 extends downwardly from a central portion of the top wall 81 into a bearing 4 mounted in the fan housing 2. During operation of the cooling fan, an alternating magnetic field established by the stator 6 interacts with a magnetic field of the permanent magnet 84 to drive the rotor 8 to rotate, thereby generating an airflow by the fan blades 86.

For enhancing the amount of airflow generated by the cooling fan, one way is to increase the size of the blades 86. However, this way will increase the size of the cooling fan, which is disadvantageous in view of miniaturization requirement of electronic products. Another way is to reduce the diameter of the hub 82. However, the yokes of the stator core 62 are formed by stamping silicon-steel sheets, each of which has a flat configuration and a predetermined diameter; thus, the size and the shape of the stator core 62 are almost fixed and difficult be altered. Due to the fixed size and shape of the stator 6, the shape and size of the rotor 8 including the hub 82 are also almost fixed and difficult to be altered. For the conventionally-shaped hub 82, a turbulent flow is produced in the area of an air inlet of the conventional electrical fan, which significantly affects the pressure and the speed of the airflow. Furthermore, the flat, disc-shaped top wall 81 of the hub 82 forms a barrier for the airflow through the fan, whereby flow rate of the airflow is adversely affected. Accordingly, the airflow provided by the conventional electrical fan cannot efficiently dissipate heat absorbed by a heat sink from a heat-generating electronic component away from the heat sink.

What is needed, therefore, is an electrical cooling fan having a relatively lager amount of airflow and a relatively smaller size.

SUMMARY OF INVENTION

According to a preferred embodiment of the present invention, an electrical fan comprises a fan housing having a central tube, a bearing received in the central tube, a stator mounted around the central tube, and a rotor being rotatably supported by the bearing in the central tube. The housing defines an air inlet and an air outlet at two different sides thereof. The stator and the rotor expand radially along a direction from the air inlet to the air outlet. The stator has a stator core which is made by powder sintering technology. The fan blades of the rotor have a larger size and thus can generate a larger amount of airflow. The hub of the rotor has a streamline shaped outer surface with the smallest diameter adjacent to the air inlet of the fan; the flowing resistance of the airflow is reduced and the turbulence flow and noise are generally avoided. Finally a larger amount of airflow with increased speed and pressure is generated, and the heat dissipating effectiveness of the electrical fan is improved.

Other advantages and novel features of the present invention will be drawn from the following detailed description of a preferred embodiment of the present invention with attached drawings, in which:

DETAILED DESCRIPTION

Figure 1:
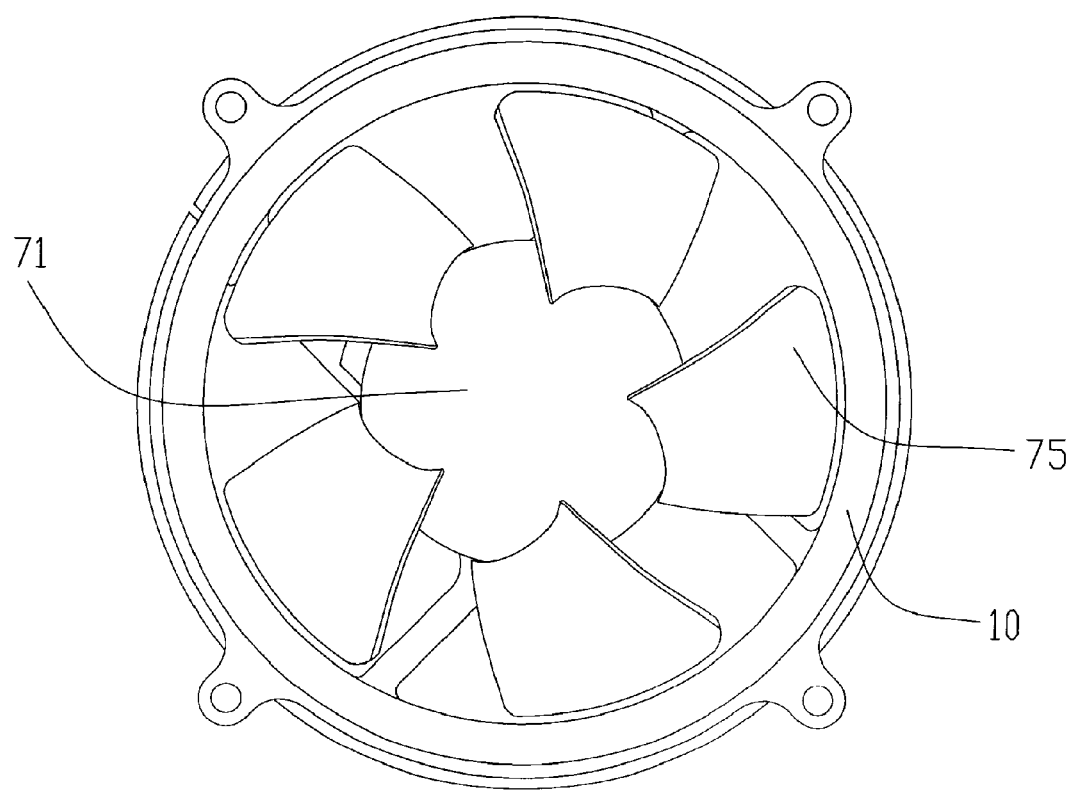
FIG. 1 is an isometric, assembled view of an electrical fan in accordance with a preferred embodiment of the present invention.
Figure 2:
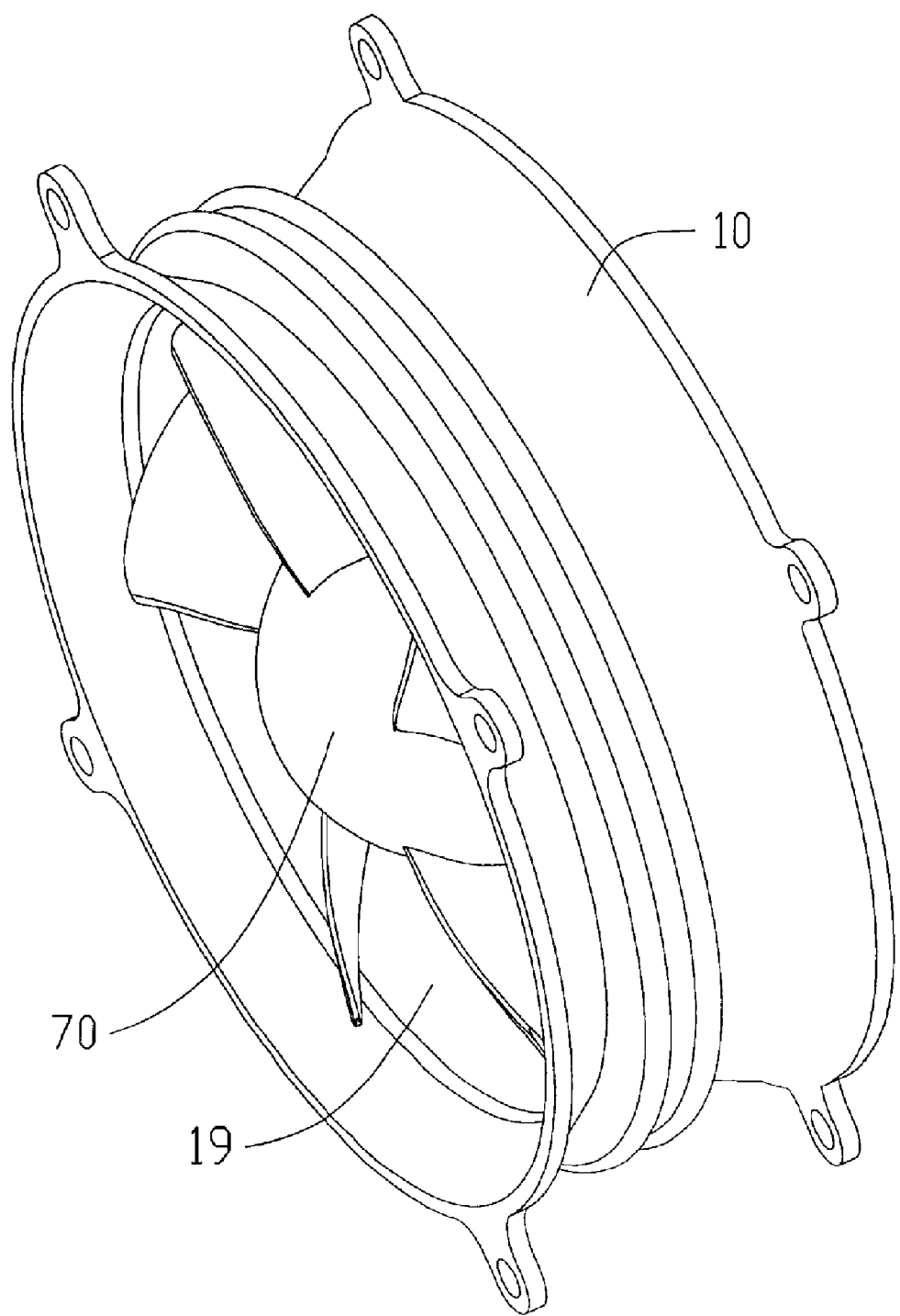
FIG. 2 is similar to FIG. 1, but viewed from another aspect.
Figure 3:
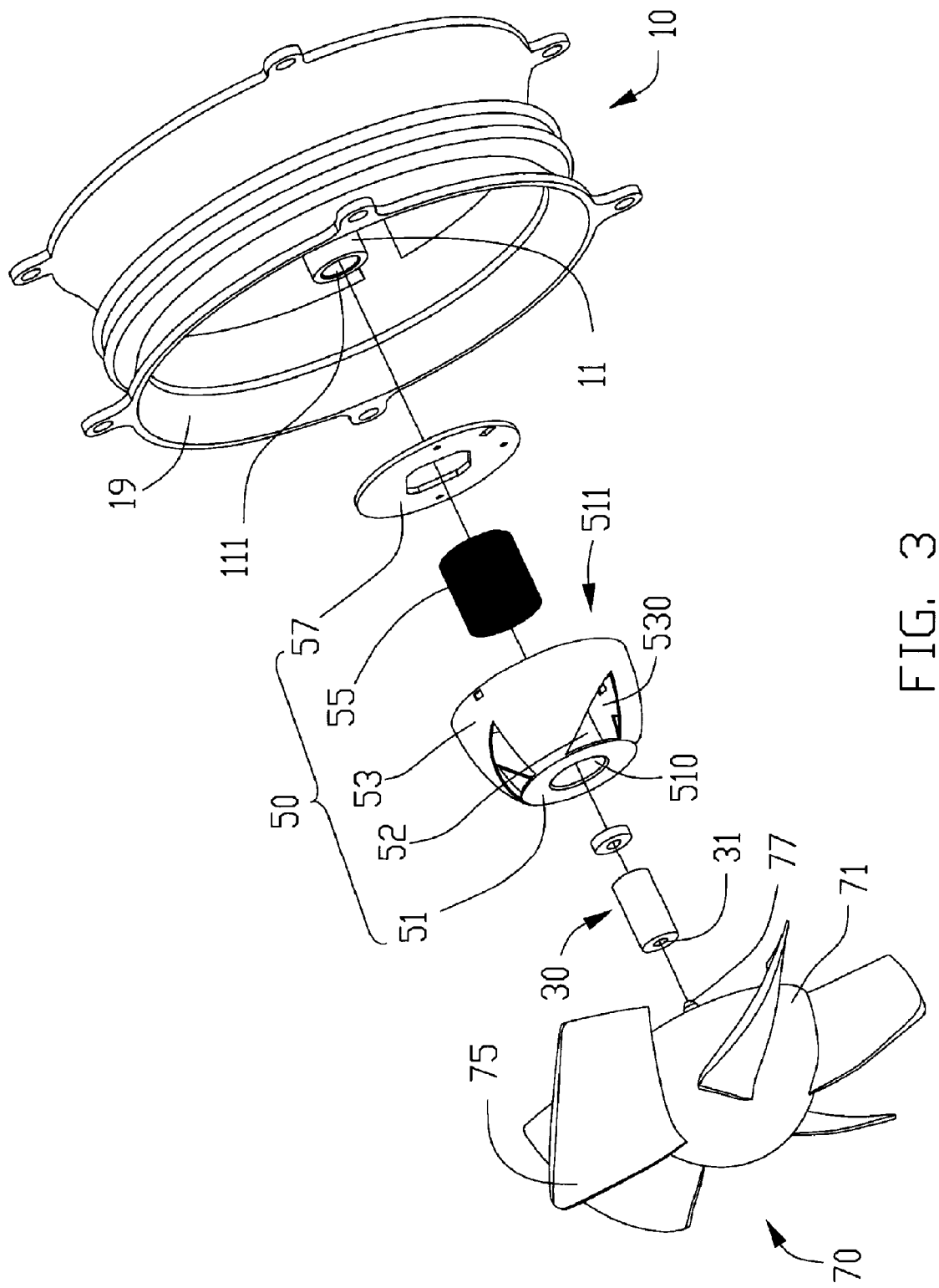
FIG. 3 is an isometric, explored view of the electrical fan of FIG. 1.
Figure 4:
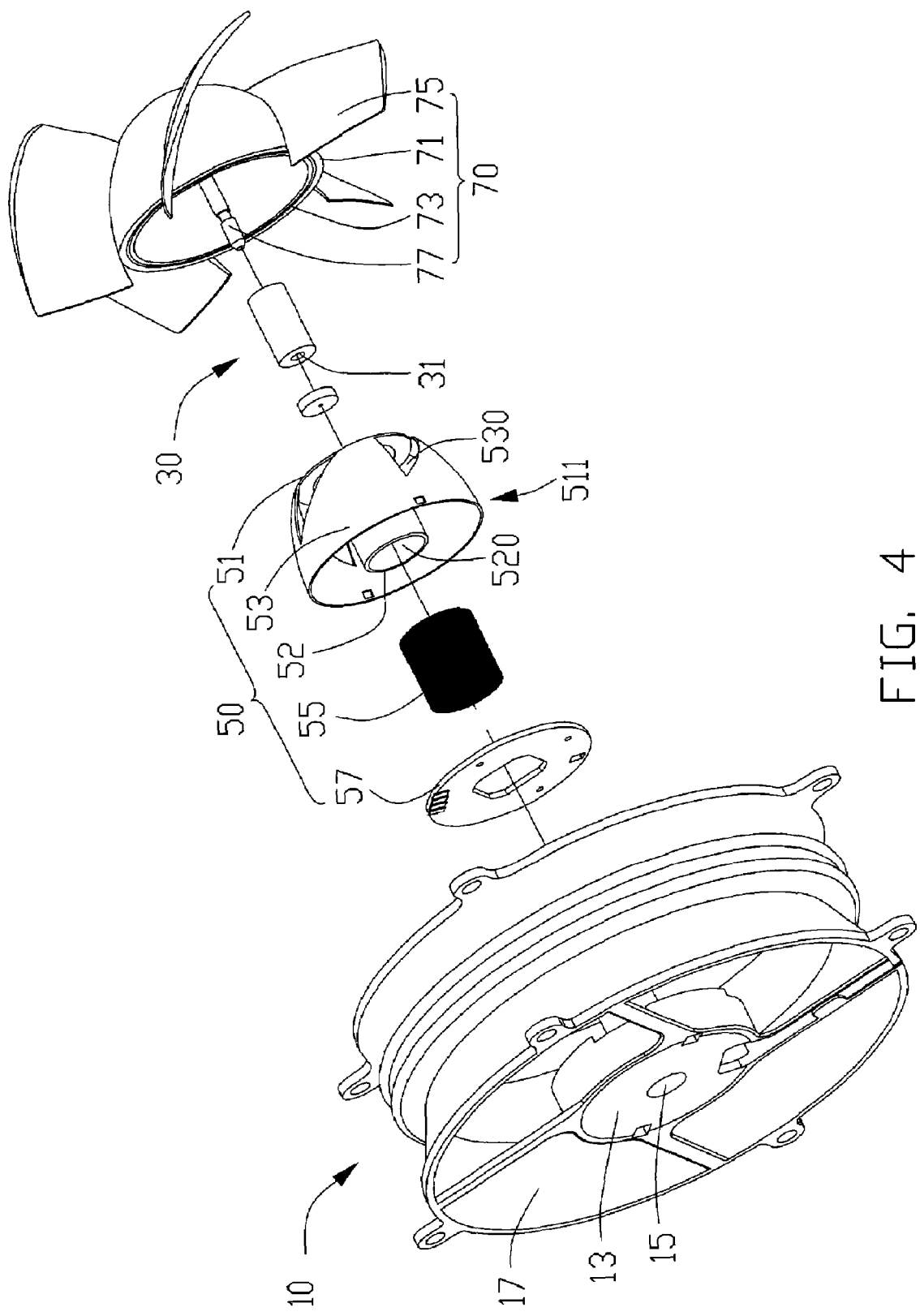
FIG. 4 is similar to FIG. 3, but viewed from a rear aspect.
Figure 5:
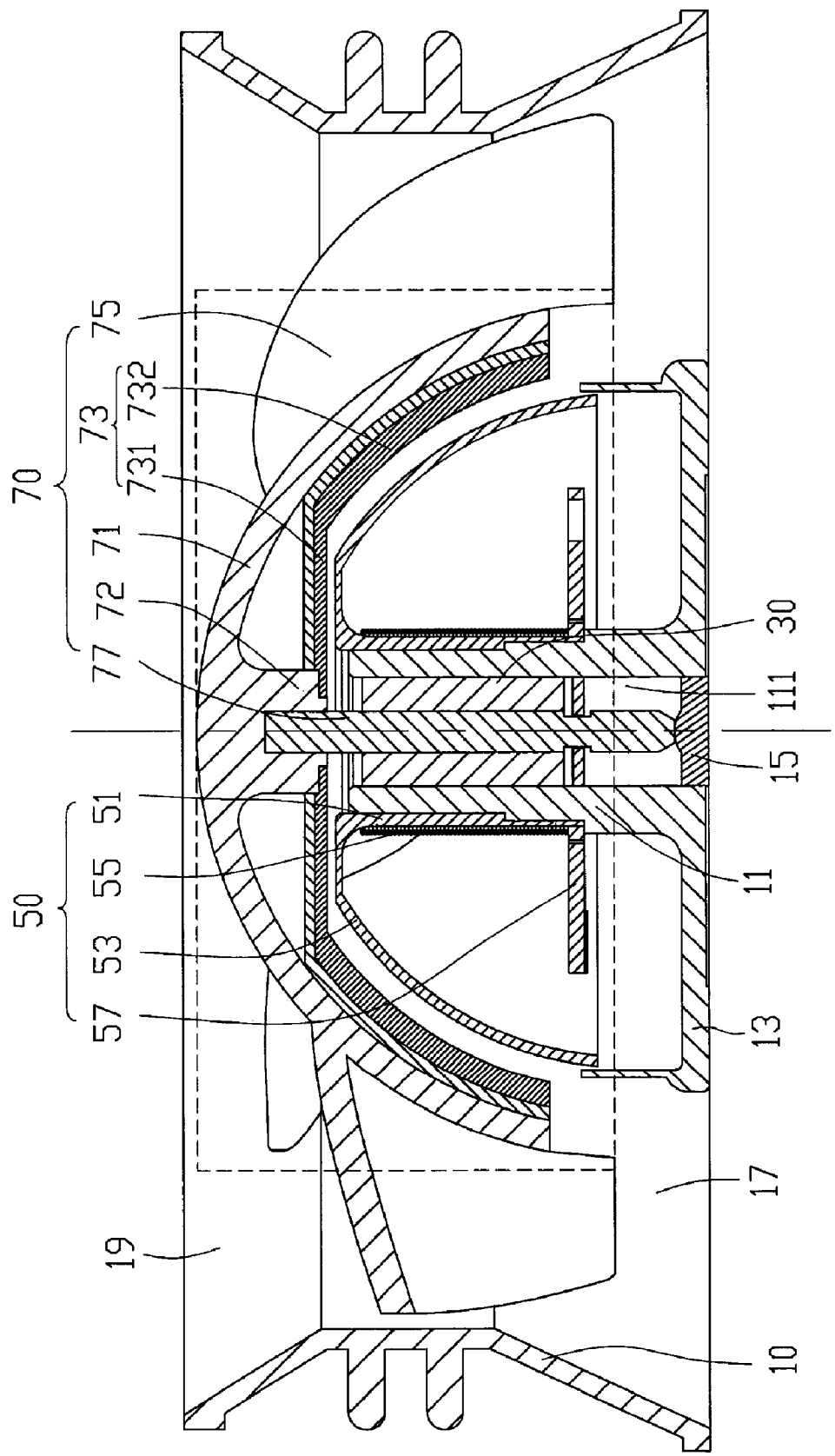
FIG. 5 is a cross-sectional view of the electrical fan of FIG. 1.

Referring to FIGS. 1 through 5, an electrical fan according to a first preferred embodiment of the present invention includes a rotor 70, a stator 50 in respective to which the rotor 70 is rotatable, a frame 10 receiving the rotor 70 and the stator 50 therein, and a bearing 30 mounted in the frame 10 for supporting the rotor 70 to rotate.

The frame 10 is approximately cylinder shaped. An air inlet 19 and air outlet 17 are defined at two opposite sides of the frame 10. An airflow generated by the electrical cooling fan flows from the air inlet 19 to the air outlet 17. The frame 10 includes a base 13 adjacent to the air outlet 17. A central tube 11 extends upwardly from a central portion of the base 13.

The central tube 11 defines a through hole 111 receiving the bearing 30 therein. An axial hole 31 is defined in the bearing 30. A sealing cap 15 couples to and seals a bottom end of the central tube 11.

The stator 50 is mounted around the central tube 11. The stator 50 includes a stator core 511, axial windings 55 wound on a tube 52 of the stator core 511 to establish an alternating magnetic field, and a PCB (printed circuit board) 57 electrically connecting with the windings 55. To avoid the windings 55 from electrically contacting with the stator core 511, an insulating layer (not labeled) is used to cover the tube 52 of the stator core 511 and electrically insulate the windings 55 from the stator core 511.

The stator core 511 includes a top wall 51 on a front end of the tube 52 and a sidewall 53 extending downwardly from an outer periphery of the top wall 51. The sidewall 53 is arc-shaped with a diameter thereof gradually increased along a direction from the front end to a rear end of the tube 52 (better seen in FIG. 5). In other words, a distance between the sidewall 53 and the tube 52 is gradually increased along a direction from the air inlet 19 to the air outlet 17. The sidewall 53 expands radially along the direction from the air inlet 19 to the air outlet 17. The top wall 51 is flat and ring-shaped and defines a circular hole 510 in a central portion for extension of the central tube 11 of the frame 10 therethrough. The tube 52 of the stator core 511 extends downwardly from an outer edge of the circular hole 510 of the top wall 51 and defines a central hole 520 communicating with the circular hole 510 of the top wall 51. A space is defined between the tube 52 and the sidewall 53 and expands radially along the flowing direction of the airflow. A plurality of slots 530 is defined in the sidewall 53 of the stator core 511 for the cooling fan to start smoothly.

Figure 8:
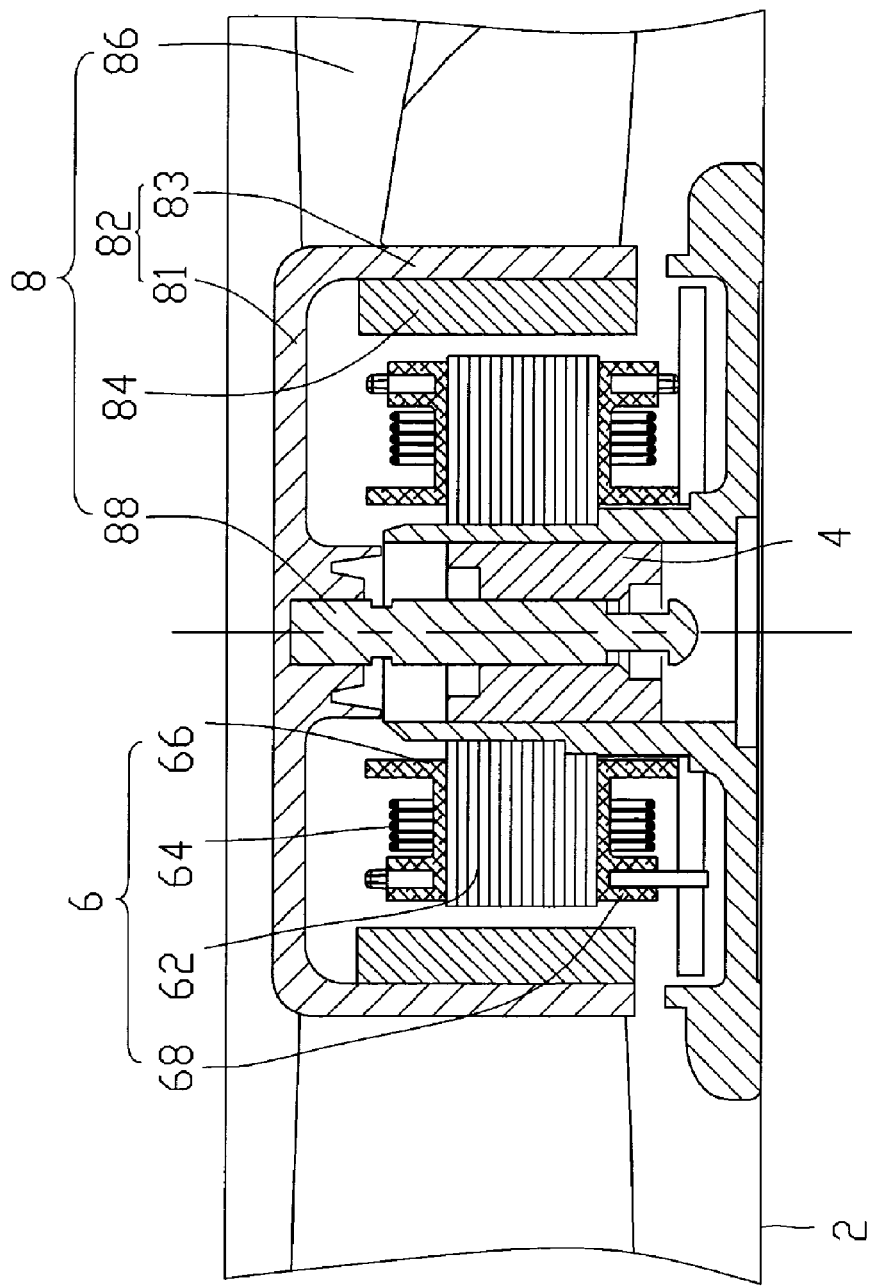
FIG. 8 is a cross sectional view of a conventional electrical cooling fan.

The rotor 70 covers the stator 50 therein and has a profile generally conforming the profile of the stator core 511. The rotor 70 includes an arc-shaped hub 71 forming a shaft seat 72 at a central portion, a shaft 77 received in the shaft seat 72 and extending downwardly thereof to be rotatably received in the bearing 30, a plurality of fan blades 75 extending radially from an outer periphery of the hub 71, and a permanent magnet 73 adhered to an inner wall of the hub 71 to establish a magnetic field. The hub 71 more specifically has a hemispherical shape. The permanent magnet 73 has a top wall 731 with a shape of a flat ring, confronting the top wall 51 of the stator core 511. Furthermore, the permanent magnet 73 has an arc-shaped sidewall 732 confronting the sidewall 53 of the stator core 511. The hub 71 has an outer diameter gradually increasing along the flowing direction of the airflow. The lower portion of the hub 71 adjacent to the air outlet 17 has a diameter relatively larger than that of the upper portion of the hub 71 adjacent to the air inlet 19. The hub 71 converges to a point at the top end thereof. In other words, an outer surface of the hub 71 is approximately streamline shaped. Thus, the turbulent flow occurring at the inlet of the conventional electric fan can be avoided in the present invention and the flowing resistance of the airflow is reduced. The hub 71 occupies a space which is not larger than ⅔ of that of the hub 82 of the conventional electrical fan of FIG. 8 when the hub 82 has a diameter the same as that of the hub 71 measured at a bottom end thereof. Thus the blades 75 of the rotor 70 can have a relatively lager size than that of the blades 86 of the conventional electric fan of FIG. 8 when the electrical fan in accordance with the present invention and the conventional fan has the same size. Accordingly, the amount of airflow generated by the fan blades 75 is greatly increased.

When the cooling fan assembly is assembled together, the axial hole 31 of the bearing 30 receives the shaft 77 therein to support the rotor 70 to rotate. During operation, the axial windings 55 wound around the tube 52 establish the alternating magnetic field interacting with the magnetic field of the permanent magnet 73 of the rotor 70 to drive the rotor 70 to rotate. The rotating fan blades 75 of the rotor 70 generate airflow to dissipate heat of a heat source. For the larger size of the fan blades 75, a relatively larger amount of airflow is generated by the electrical fan of the present invention. As the airflow flows through the electrical fan to the heat source, the flowing resistance is low for the streamline shaped outer surface of the hub 71. Also the turbulent flow and noise are generally avoided. The speed and pressure of the airflow are increased. After leaving the air outlet 17, the larger amount of airflow with increased speed and pressure blows onto the heat source and takes away the heat of the heat source effectively. Thus, the flow rate of the airflow and the heat dissipating effectiveness of the electrical cooling fan are improved.

Figure 6:
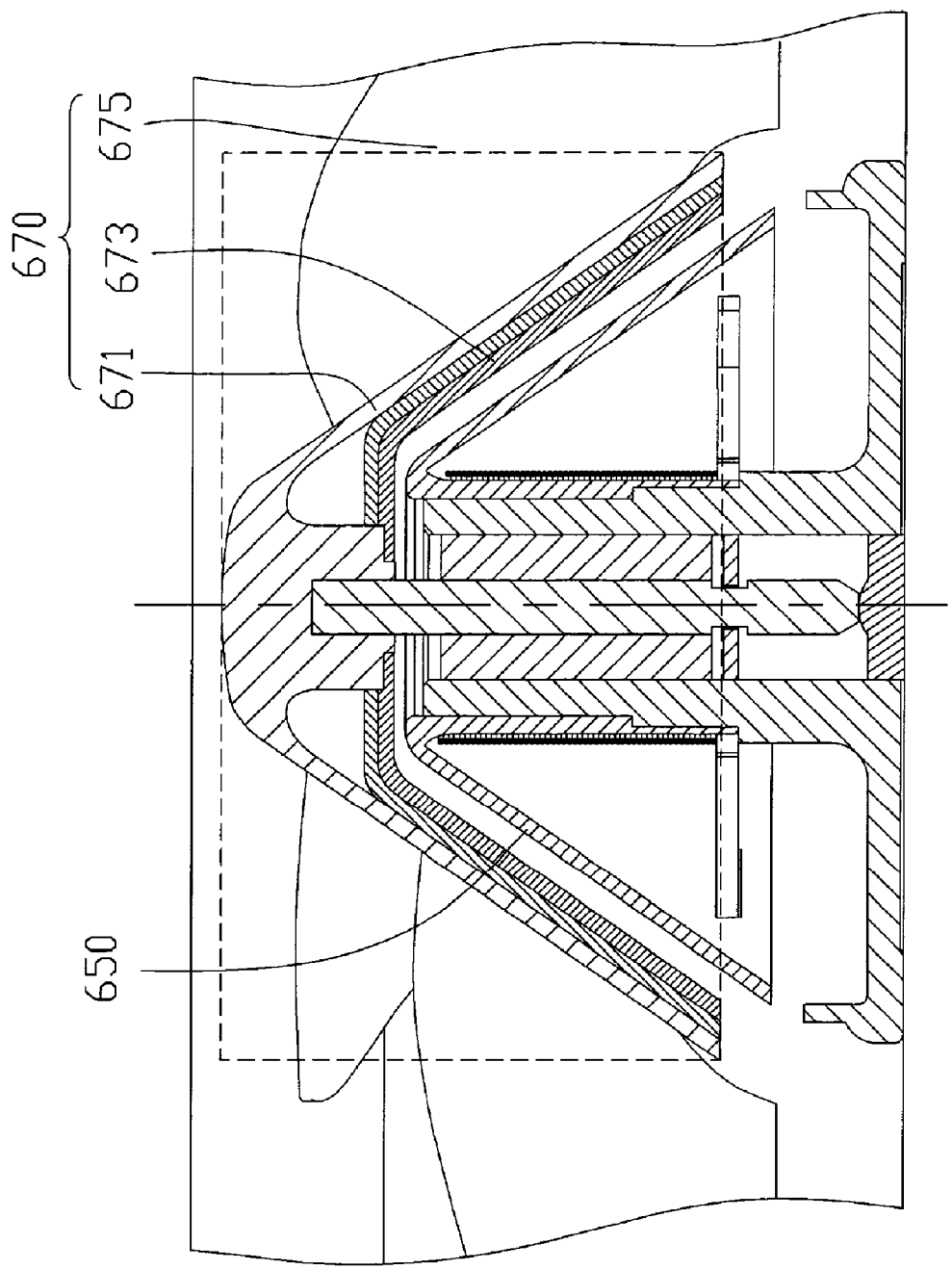
FIG. 6 is a cross-sectional view of electrical fan in accordance with a second embodiment of the present invention.

FIG. 6 illustrates an alternative embodiment of the present invention. Except for the stator 650 and rotor 670, other parts of the cooling fan in accordance with this second embodiment have substantially the same configuration with the cooling fan of the previous first preferred embodiment. In this embodiment, the stator core of the stator 650 has a shape of a truncated cone. The hub 671 and the permanent magnet 673 of the rotor 670 each has a truncated-conical shape generally corresponding to that of the stator core. The volume of the truncated-cone shaped hub 71 is approximately ⅓ of that of the hub of the conventional electrical fan. Thus the fan blades 675 have a larger size and can generate an airflow with a higher flow rate.

Figure 7:
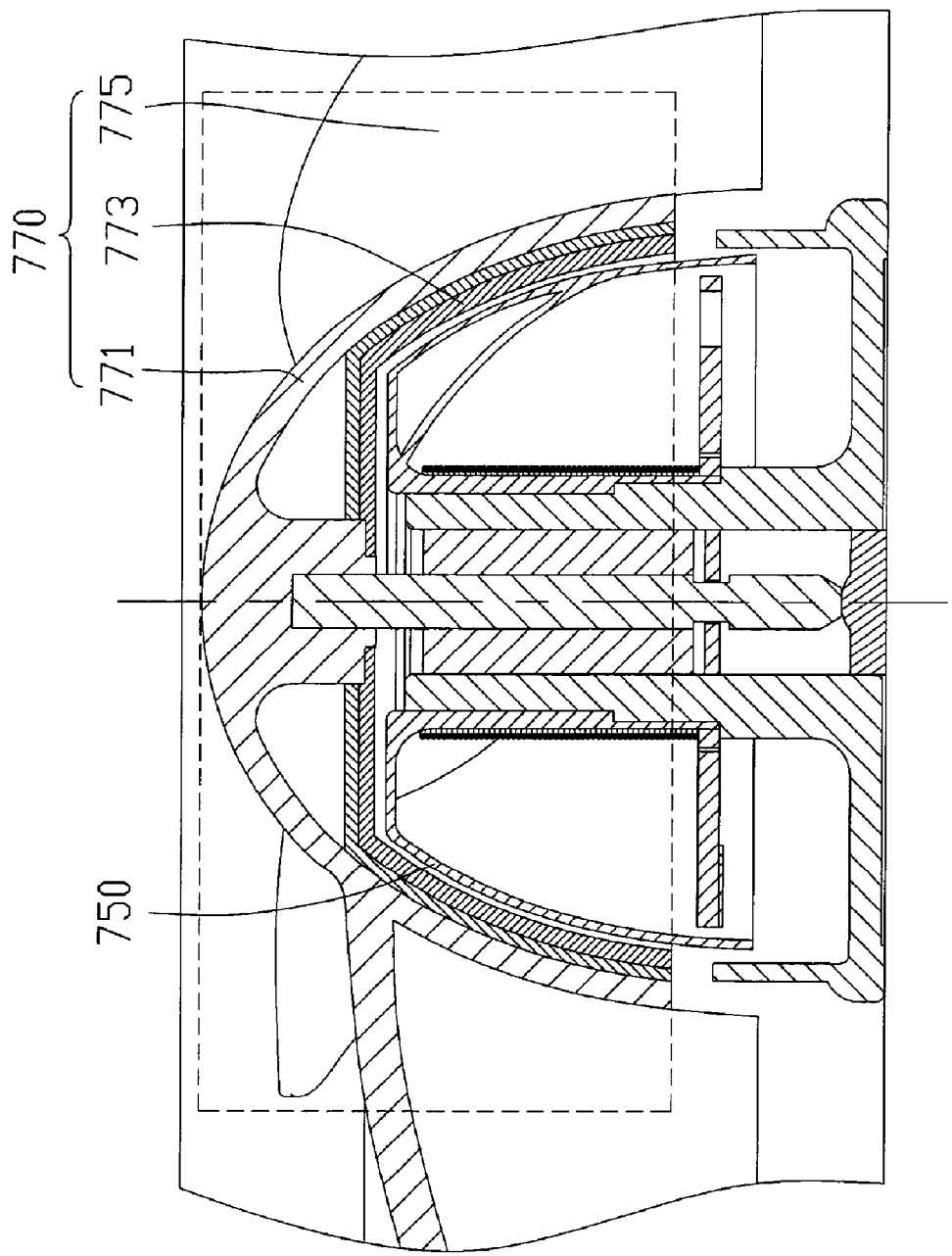
FIG. 7 is a cross-sectional view of an electrical fan in accordance with a third embodiment of the present invention.

Referring to FIG. 7, it illustrates a third embodiment of an electrical cooling fan in accordance with the present invention. In this embodiment, the hub 771 of the rotor 770 has a configuration of a hemi-ellipsoid. The stator 750 has a shape corresponding to the rotor 770. In this design, the volume of the hub 771 can be further decreased, whilst the size of the fan blades 775 further increases. Also the fan blades 775 of the rotor 770 can generate a relatively larger amount of airflow.

Also the stator core and the hub can be formed in other shapes if each of which has a profile with a small diameter at the front end thereof adjacent to the air inlet 19 of the electrical fan and a large diameter at the rear end near the air outlet 17 of the electrical fan. Such design not only reduces the flowing resistance of the airflow, but also decreases the volume of the hub and finally improves the amount of airflow. To form the stator core of the present invention, which has a complex configuration than the conventional stator, the stator core is made by powder sintering technology wherein a particle of powder for forming the stator has a Core-Shell structure. Such a Core-shell structure of the powder can reduce the eddy current loss of the stator core. The Core-Shell structure of the powder has a core portion for generating magnetic force, and a shell portion for providing bond for interconnecting the core portions of the powder together. The electrical resistance of the shell portions is greater than that of the core portions. Details regarding the Core-Shell structure of the powder for forming the stator core of the present invention can be referred to the co-pending application entitled "FERROMAGNETIC POWDER FOR DUST CORE". In the preferred embodiments as disclosed above, the stator core 511 is integrally formed. Alternatively, the tube 52 can be formed separately and then assembled to the other part of the stator core 511.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. An electrical fan comprising:
 a fan housing having a central tube extending therein, the housing defining an air inlet and an air outlet at two different sides thereof;
 a bearing received in the central tube;
 a stator mounted around the central tube, the stator comprising a stator core having a disc-shaped top wall and a sidewall extending downwardly from an outer periphery of the top wall, a tube extending downwardly from a central portion of the top wall, and windings wound around the tube, the sidewall expanding radially along a direction from the air inlet to the air outlet; and
 a rotor being rotatably supported by the bearing in the central tube the rotor comprising a hub having a shape substantially corresponding to the stator and expanding radially along the direction from the air inlet to the air outlet, and a plurality of fan blades extending radially from the hub towards the fan housing, a length of each of the fan blades in a radial direction of the hub gradually increasing along a direction from the air outlet to the air inlet for increasing a size of the each of the fan blades.

2. The electrical fan as claimed in claim 1, wherein the rotor is hemisphere-shaped.

3. The electrical fan as claimed in claim 1, wherein the rotor has a shape of a truncated cone.

4. The electrical fan as claimed in claim 1, wherein the rotor has a shape of a hemi-ellipsoid.

5. The electrical fan as claimed in claim 1, wherein a plurality of slots are defined in the sidewall of the stator core.

6. The electrical fan as claimed in claim 1, wherein the stator core is integrally formed by powder sintering technology.

7. The electrical fan as claimed in claim 6, wherein the stator core is made of composite soft magnet powder, a particle of the powder having a Core-Shell structure, wherein the shell has an electric resistance larger than that of the core.

8. A motor, comprising:
 a stator having a stator core comprising a disc-shaped top wall, a sidewall extending downwardly from an outer-periphery of the top wall, a tube extending downwardly from a central portion of the top wall, and windings wound on the tube of stator core;
 a rotor being rotatably supported by a bearing in the stator; wherein the sidewall of the stator core expanding radially along an axial direction thereof, and the rotor has a shape substantially corresponding to the stator, the rotor comprising a hub expanding radially along a direction from an air inlet to an air outlet, and a plurality of fan blades extending radially from the hub, a length of each of the fan blades in a radial direction of the hub gradually increasing along the direction from the air outlet to the air inlet for increasing a size of the each of the fan blades.

9. The motor as claimed in claim 8, wherein the stator core is integrally formed by powder sintering technology.

10. The motor as claimed in claim 8, wherein the stator core has a shape of a hemisphere.

11. The motor as claimed in claim 8, wherein a plurality of slots are defined in the sidewall of the stator core.

12. The motor as claimed in claim 8, wherein the stator core has a shape of a truncated-coin.

13. The motor as claimed in claim 8, wherein the stator core has a shape of a hemi-ellipsoid.

14. An electrical fan comprising:
 a frame having an air inlet and an air outlet, an airflow generated by the electrical fan flowing from the inlet to the outlet;
 a stator comprising:
  a stator core integrally formed by powder sintering technology and having an outer wall and a center tube in the outer wall, the outer wall having a diameter gradually increasing along a direction from the inlet to the outlet; and
  a winding wound around the center tube;
 a bearing received in the tube of the stator core;
 a rotor comprising:
  a hub covering the stator core and having a diameter gradually increasing along the direction from the air inlet to the air outlet;
  a shaft fixed to the hub and rotatably mounted in the bearing;
  a permanent magnet attached to the hub; and
  fan blades extending radially outwardly from the hub towards the frame, a length of each of the fan blades in a radial direction of the hub of gradually increasing along a direction from the air outlet to the air inlet for increasing a size of the each of the fan blades.

15. The electrical fan as claimed in claim 14, wherein the hub has a shape of a hemisphere.

16. The electrical fan as claimed in claim 14, wherein the hub has a shape of a truncated-cone.

17. The electrical fan as claimed in claim 14, wherein the hub has a shape of a hemi-ellipsoid.

* * * * *